May 16, 1939.  W. LORENZ ET AL  2,158,787
GAS VALVE AND CONTROLLING ARRANGEMENT THEREFOR
Filed May 5, 1937   8 Sheets-Sheet 1
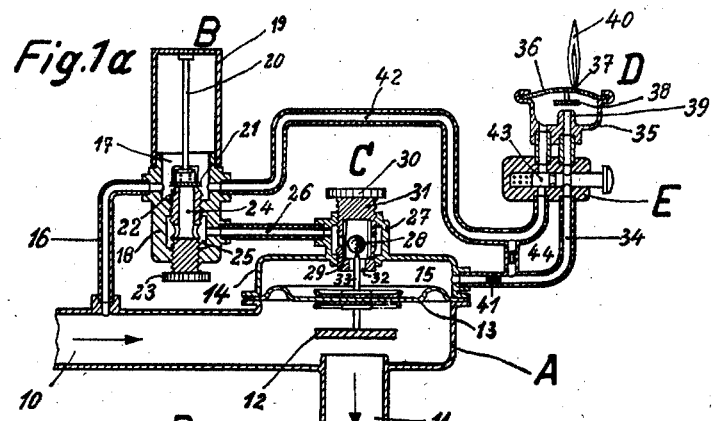
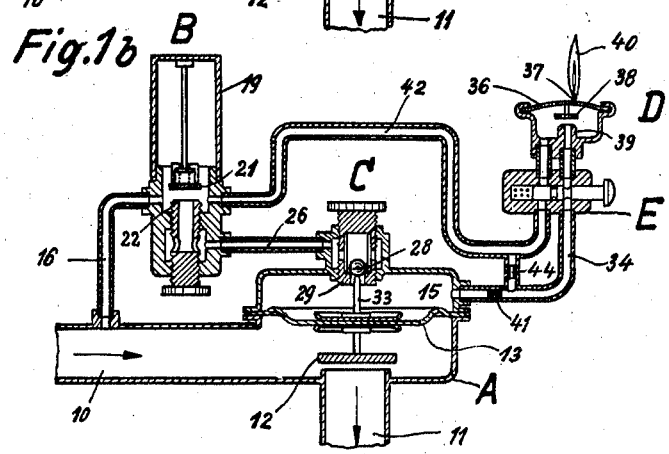
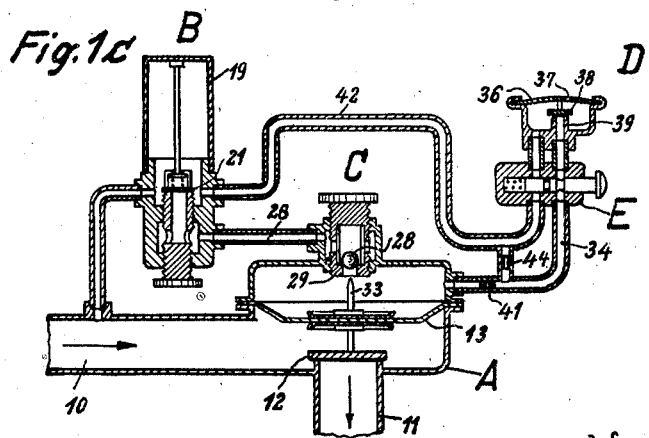
Inventors
Werner Lorenz
Curt Steinhardt
by Roy F. Steward
their attorney

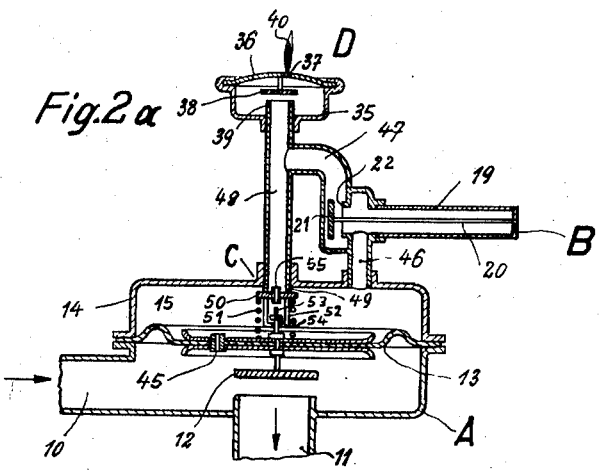
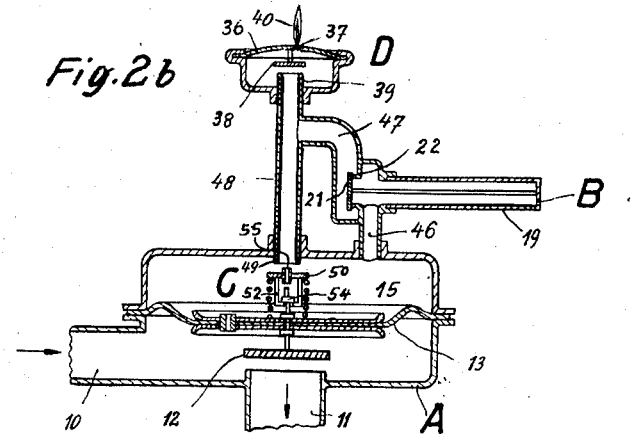
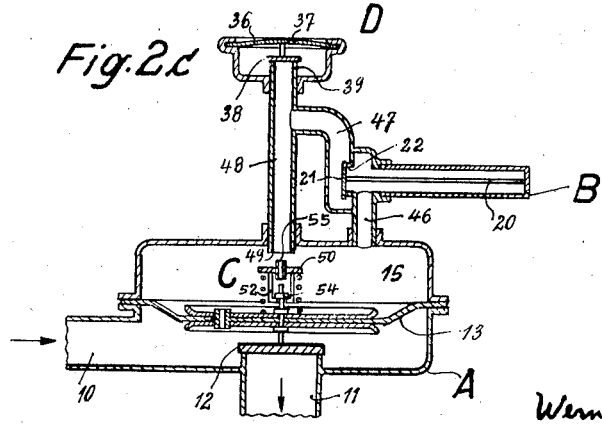

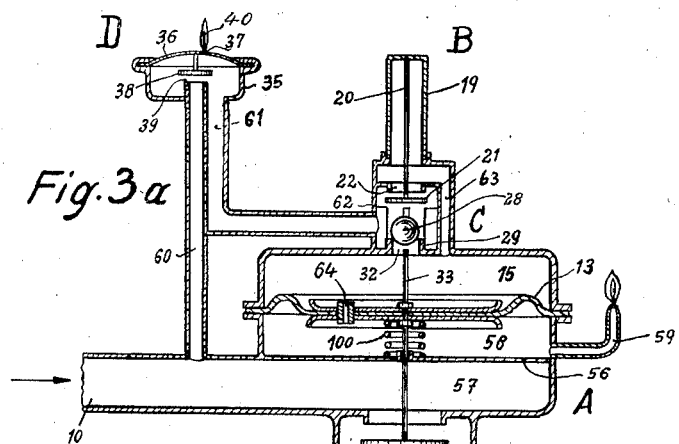
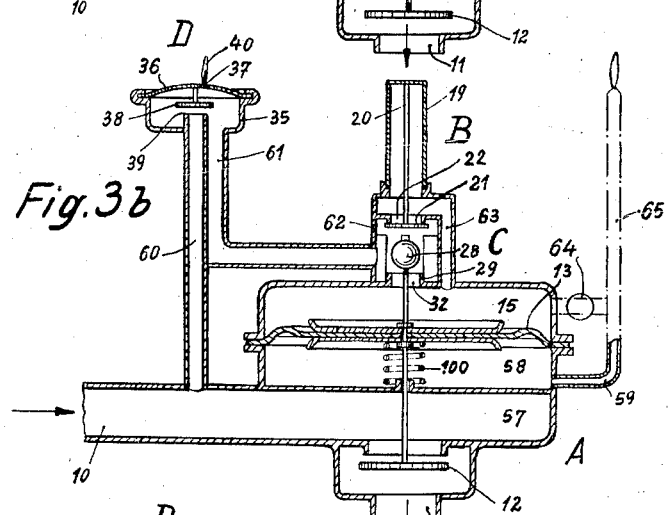
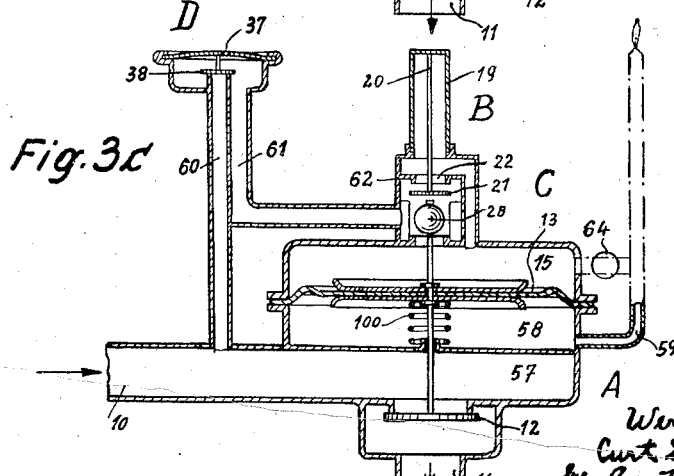

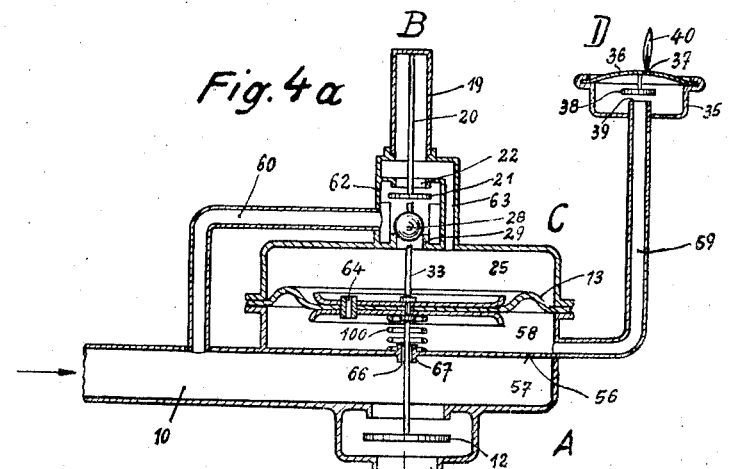
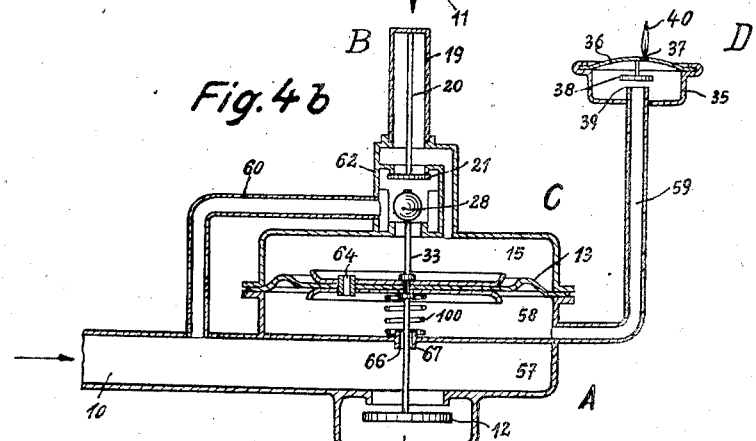
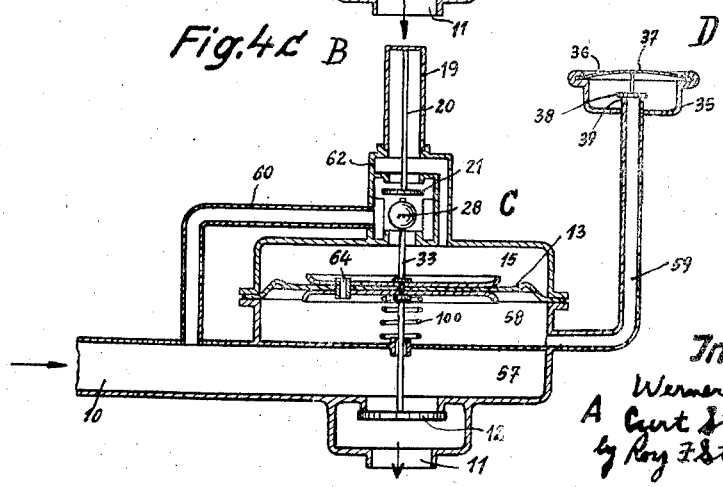

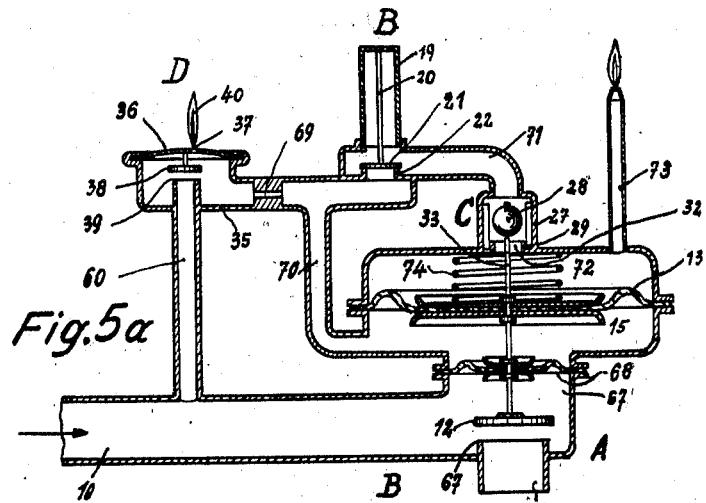
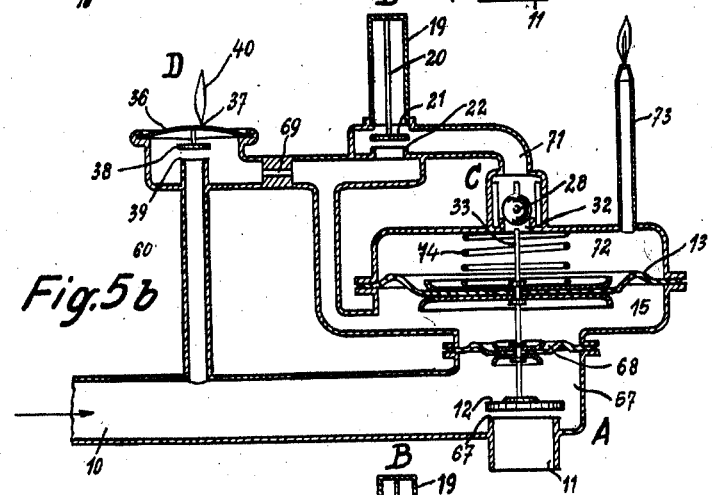
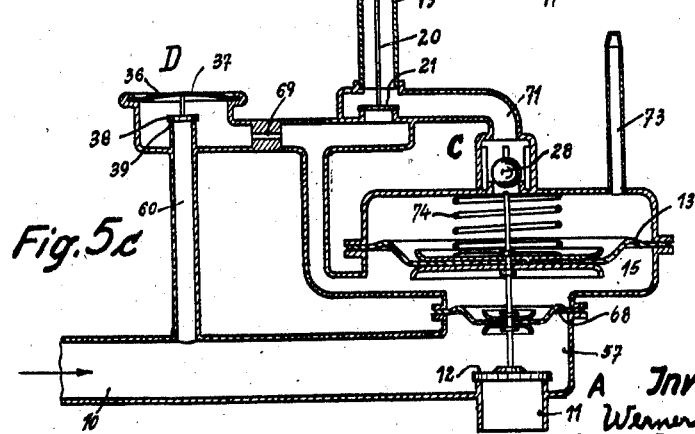

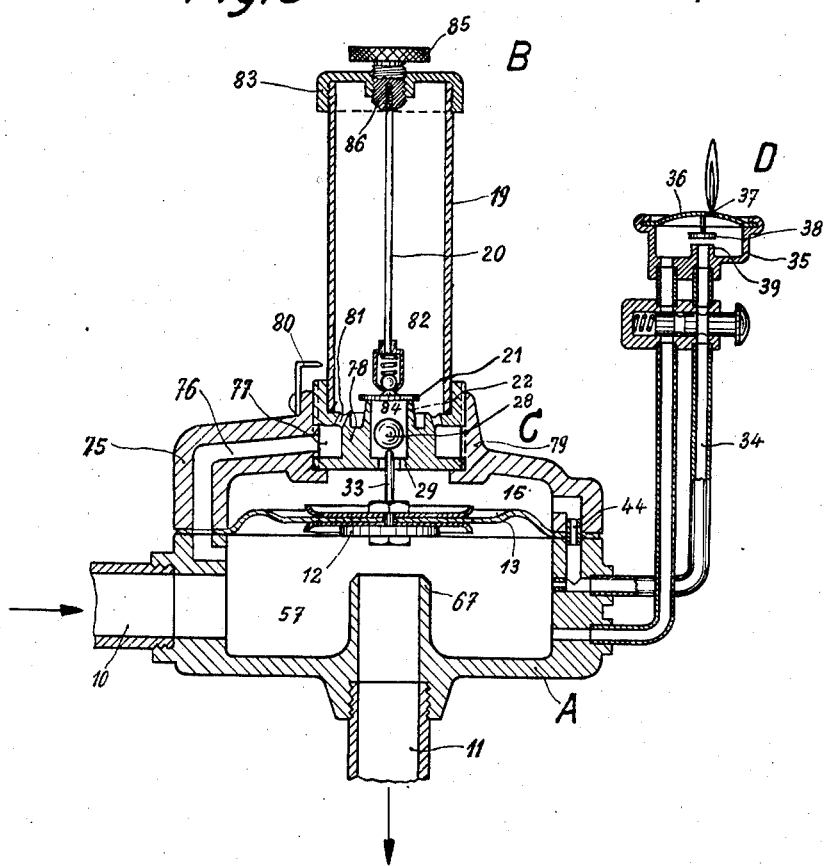

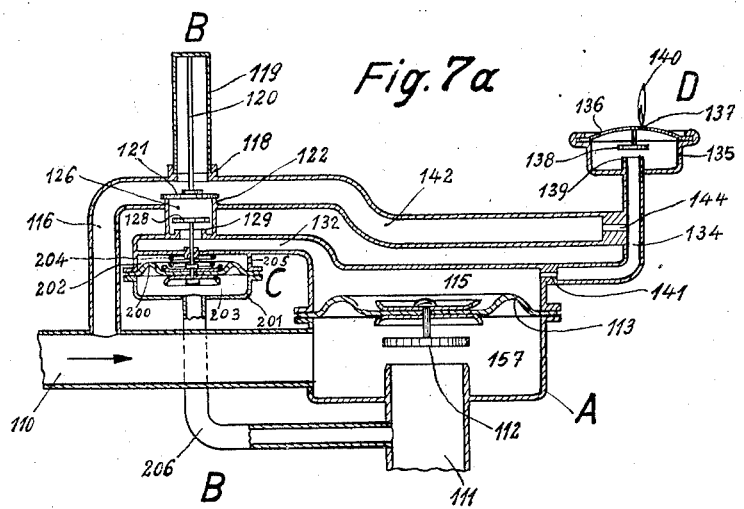
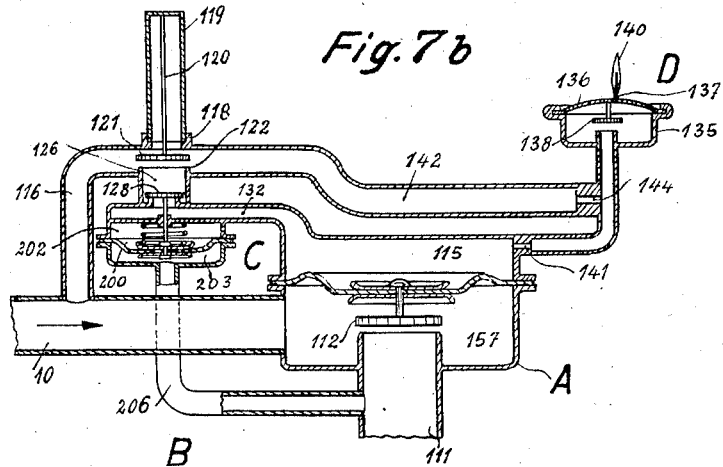
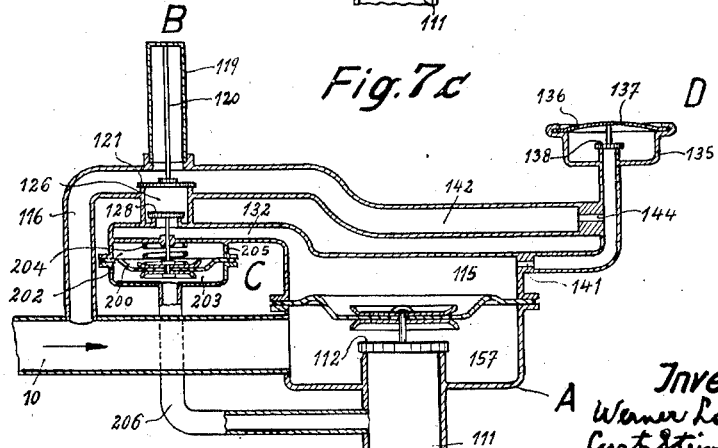

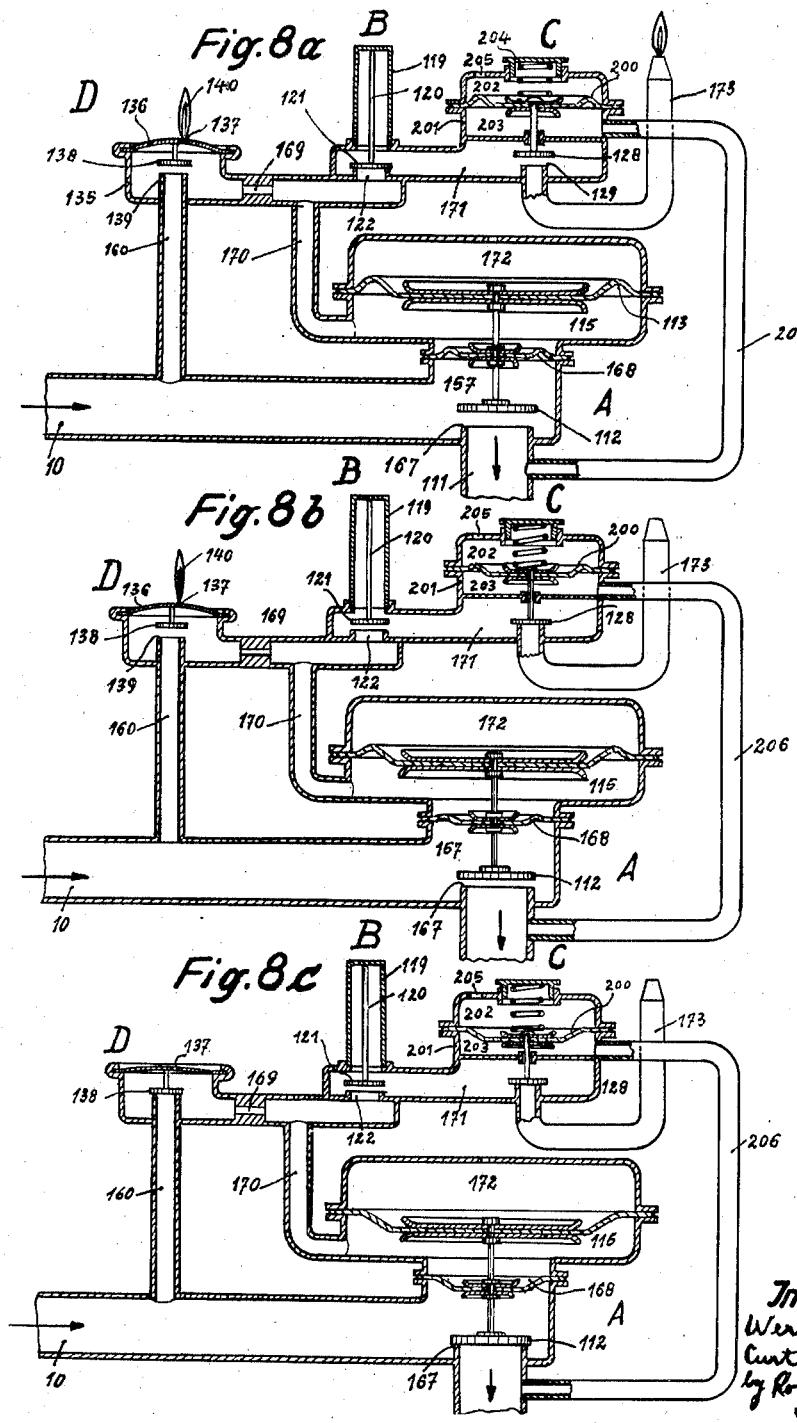

Patented May 16, 1939

2,158,787

UNITED STATES PATENT OFFICE 2,158,787

GAS VALVE AND CONTROLLING ARRANGEMENT THEREFOR

Werner Lorenz, Frankfort-on-the-Oder, and Curt Steinhardt, Dessau, Germany, assignors to Junkers & Co. G. m. b. H., Dessau, Germany Application May 5, 1937, Serial No. 140,990. In Germany, Great Britain, and Belgium May 8, 1936

5 Claims. (Cl. 137—153)

This invention relates to main gas valves of the kind wherein the valve is actuated by the pressure in a control gas pipe, the said valve being adapted to be closed completely by a safety valve on the occurrence of dangerous working conditions and also being adapted to be regulated by a regulating valve to adjust the supply of gas to the burner in accordance with the heat requirements of the apparatus.

It is already known to provide, in the path of the control gas, control valves which—on the occurrence of potentially dangerous working conditions (such as extinction of the pilot flame, local superheating in the apparatus, failure of a current of cooling water or air, unduly low water level, or excessive pressure, in the boiler, and similar conditions)—cause the main gas-supply valve to shut down completely, in order to prevent any danger to the installation or the user. It is also known to equip the control-gas tube with valves (such as automatic thermostats or the like) which adapt the supply of gas to the burner of the heating installation or device, to the heat requirements (such as a desired water—or room temperature) of the installation. It is also known to limit the closing movement of such main gas-supply valves by means of a fixed stop, or to provide a bypass for a small supply of gas, in order that the main burner may never go out altogether, but continue to burn with a small flame. Such reduction of the burner flame is particularly essential in the case of large burners of heating boilers, heating stoves and the like, because progressively acting regulators open the main gas valve at only such a slow rate that the small amounts of gas flowing to the main burner would not ensure ignition, over the large surface of the burner, by a small ignition flame, thereby leading to the danger of delaying the ignition of the issuing gas until an explosive mixture had been formed in the combustion chamber of the heating apparatus. Since it is not possible to fulfill the joint requirements of (1) complete shutting down of the main gas valve on the occurrence of potentially dangerous working conditions, and (2) reduction of the admission of the gas to a small quantity, by means of a fixed stop for the main valve, or by means of a bypass for this reduced supply, it has hitherto been necessary to employ, in such cases, two separate main supply valves, one of which was arranged to act as a safety valve, for completely shutting off the gas supply, whilst the other, acting as a control valve, was fitted with a stop, or a bypass opening, for reducing the gas supply to the burner.

The invention avoids this inconvenience by providing—in the case of a main gas valve, the control-gas passages of which are fitted with the safety control valve for completely closing the main gas valve, and with control valves which are influenced by the working conditions of the plant and regulate the supply of gas through the main valve in accordance with said conditions—the control-gas passages with an additional control valve which has no influence on the safety control valve completely closing the main valve, but prevents the main valve from being completely closed by the sole influence of the regulating valve, inasmuch as, when the passage of gas through the main valve has been reduced to a predetermined amount, the action of the regulating valve is suspended and a state of equilibrium is established between the forces acting on opposite sides of the diaphragm of the main valve, so that the diaphragm and valve remain in the adjusted position.

The functioning of this auxiliary control valve may be subordinated to the setting of the diaphragm of the main valve, or to the gas pressure prevailing in the pipe, leading to the burner, on the further side of the main valve. The arrangement of the auxiliary control valve necessarily varies in accordance with the method of control (whether it is to be opened, or closed, by an increase in pressure), and whether the valve is located in the intake or outlet of the control chamber of the main gas valve. The sole essential is that this auxiliary small supply control valve acts only against the effect of the regulating control valve, while exerting no influence on the safety control valve for effecting the complete closing of the main gas valve.

Several typical embodiments of the invention, with different arrangements of the control valves, are illustrated in the accompany drawings.

Figs. 1-5 (a, b and c) represent, in each case, three different operative settings of main gas valves, in which the small-admission control valve is actuated in subordination to the setting of the diaphragm of the main gas valve.

Fig. 6 shows the combination of an adjustable small admission control valve with an adjustable regulating control valve (thermo-regulator).

Figs. 7 and 8 (a, b and c) each show three operative positions of a main gas valve, the small-admission control valve of which is actuated by the pressure of the gas in the pipe leading to the burner.

In Figs. 1, a, b and c, the main gas valve is generally indicated by A and it has a main supply pipe 10, and a main delivery pipe 11 controlled by a main valve head 12 and leading to the main burner (not shown) of a heating installation, such as a heating boiler or stove. The valve head 12 is connected to a diaphragm 13 actuated by the pressure of the gas in a control chamber 15 formed by the cover plate 14. Branching from the main supply pipe 10 is a control-gas pipe 16 opening into the chamber 17 of the valve casing 18 of a regulating control valve generally indicated by B, which latter, in the embodiment shown, is designed as a thermo-regulator. However, it will be evident that this thermo-regulator might be replaced by any other progressively acting regulator. The control valve B represented in Fig. 1 a—c consists of a tubular, heat-sensitive member 19, with a high coefficient of expansion, and of a rod 20, with a low coefficient of expansion, to which is attached a control-valve member 21 in a, preferably, yieldable manner. So long as the sensitive member 19 is cold, it holds the valve member 21 down on the seating 22 which is preferably formed by the inner end of a hollow screw 24 adapted to be adjusted from the outside, by hand—by means of a head 23—with the object of adjusting the action of the control valve. From the chamber 25 in the lower portion of the valve casing 18, a branch 26 leads into the casing 27 of a small-admission control valve generally indicated by C, comprising a ball 28, and valve seating 29 which is located on the lower end of a hollow screw 31 adapted to be adjusted by means of the head 30. Said screw 31 is provided with lateral orifices for the passage of the control gas, and also serves to guide the ball 28. The outlet passage 32 of the valve seating 29 leads into the control chamber 15 of the main gas valve A, and a valve spindle 33, connected to the diaphragm 13 of the main valve passes through the valve seating 29 and makes contact with the ball 28 of the small-admission control valve C. From the control chamber 15 of the main gas valve A, the control-gas outlet pipe 34 leads to the casing 35 of a safety burner D which, in the example shown, serves as safety control valve. Said burner D comprises a thermostat plate 36, which covers the open end of the casing 35 and is provided with a burner orifice 37. Attached to the thermostat plate 36, is a control-valve 38 adapted to coact with a valve seating 39 to which the outlet pipe 34 is connected. So long as the pilot flame 40 is alight, the hot thermostat plate 36 raises the valve 38 from its seating 39 and allows the control gas to issue from the pipe 34 and be consumed by the flame. However, directly the flame 40 goes out, the thermostat plate 36 presses the valve 38 on to its seating 39 and thereby stops the outlet of the control-gas pipe 34. The volume of control gas issuing from the control chamber 15 of the main valve A, is regulated by a choke 41, located in the pipe 34. From the chamber 17 of the thermo-regulator B, a pipe 42, supplying gas for the pilot flame, leads direct to the casing 35 of the safety burner D and bypasses the thermostatically controlled valve 38, 39. The pipe 42 is normally closed by the piston valve 43 of a self-closing valve E and is opened only when the safety burner D is to be used. The pipe 42 communicates with the delivery pipe 34 for the control gas, by way of a choke 44, which, for the purpose of continuously maintaining a pilot flame 40 permits the passage of only a small supply of gas to the burner orifice 37 of the thermostat plate 36 of the burner D.

The arrangement shown in Figs. 1a, b and c functions in the following manner:

In Fig. 1a, the pilot flame 40 of the safety burner D is alight, so that the outlet orifice 39 of the pipe 34 keeps open. The regulating control valve 21, 22 of the thermo-regulator B is closed, because the sensitive member 19 is still cold. Consequently, the control gas can pass, only through the choke 44, into the control-gas delivery pipe 34, from which, however, it issues through the burner orifice 37 of the safety burner D, and burns without being able to set up any back pressure in the control chamber 15 of the main gas valve A. The diaphragm 13 is therefore subjected only to the pressure of the gas coming from the main supply pipe 10, so that the head 12 of the main valve is lifted high above its seating and allows the gas unrestricted passage through the main valve A. If now the heat-sensitive member 19 becomes heated by the heating action of the main burner, it gradually opens the regulating control valve 21, 22 and allows the control gas to pass, by way of the pipe 26 and the ball valve 28, 29—held open by the spindle 33—of the small-admission control valve, into the control chamber 15 of the main valve A, from which it can flow only to the extent allowed by the choke 41. Consequently, there is set up in the control chamber 15 an increase of pressure which depresses the diaphragm 13, so that the main valve member 12 checks the passage of gas to the main burner. However, the descent of the diaphragm 13 is shared by the spindle 33, which has, hitherto, kept the ball valve 28, 29 open; and finally, when the diaphragm 13 has descended to a predetermined level, the ball 28 rests on its seating and prevents any further supply of control gas to the control chamber 15, or throttles it to such an extent that a state of equilibrium is established between the forces acting on the opposite sides of the diaphragm 13, the latter remaining in the position in which it keeps the head 12 of the main valve slightly open (Fig. 1b). This position then becomes the small-admission setting of the main valve A, which keeps the main valve A slightly open, independently of the further action of the regulating control valve tending to completely shut off the supply, and the main burner continues to function, with small gas supply, but without going out. Directly, however, the pilot flame 40 of the safety burner D is extinguished (Fig. 1c), the cooled thermostat plate 36 closes the safety control valve 38, 39. In consequence, the control gas passing through the pipe 42 and choke 44, accumulates in the closed delivery pipe 34 and the control chamber 15 of the main valve A, and depresses the diaphragm 13 to such an extent that the head 12 of the main valve completely shuts off the supply of gas to the main burner. It will be clearly evident that, when this happens, the action of the small-admission control valve is rendered inoperative and cannot prevent the main valve from being fully closed. In the example according to Figs. 1a, b and c, the effective aperture of the main valve can be adjusted by raising, or lowering, the seating 29 of the small-admission control valve C by turning the hollow screw 31.

Figs. 2a, b and c, show a main gas valve which is shut down by increased pressure in its control chamber 15, both the regulating control valve B and the safety control valve D, being, however, located in the outlet from the control chamber. The control gas enters through a choke 45, into the control chamber 15 above the diaphragm 13 and flows through the pipe 46, 47—controlled by the thermo-regulator B, or the control valve 21, 22 of same—into the delivery pipe 48, the outlet 39 of which is again controlled by the valve 38 of the thermostatic safety burner D. The opening 49 of the pipe 48 into the control chamber 15 is controlled by the small-admission valve C. In the example shown, this latter valve comprises a valve plate 50 which is kept closed by a spring 51—preferably disposed between the diaphragm 13 and valve plate 50—and is connected with the diaphragm 13 by means of a bracket 52 and a driver 54, vertically adjustable on the diaphragm spindle 53—with such an amount of lost motion that the diaphragm 13 does not lift the valve plate 50 from its seating 49 until the diaphragm itself has descended to a predetermined level (small-admission position). The valve plate 50 is provided with a choke 55, through which gas is admitted to the pilot flame when all the control valves are closed. Said choke may, however, be located at any other point of the outlet from the control chamber.

The arrangement shown in Figs. 2a, b and c, functions in the following manner:

In Fig. 2a, the main gas valve is again represented with the pilot flame 40 alight, and the heat-sensitive member 19 cold. In this case, however, the control valve 21, 22 of the thermo-regulator B is arranged so as to be open when the member 19 is cold, and closed as the latter becomes warmer. The control gas entering the control chamber 15 through the choke 45 flows, therefore, through the choke 55 and the open thermo-regulator valve 21, 22 to the safety ignition burner D, from which it issues without exerting any back pressure on the diaphragm 13. Consequently, the diaphragm is lifted by the main gas pressure and fully opens the main gas valve A. As it becomes warmer, the sensitive member 19 closes the control valve 21, 22 so that the control gas accumulates in the control chamber 15 and depresses the diaphragm 13. Directly, however, the diaphragm 13 has reached the predetermined small-admission position, the driver 54 opens the previously closed small-admission control valve 49, 50 so that a portion of the gas accumulated in the chamber 15 can pass away (Fig. 2b). Thus, in this case also, the small-admission control valve C counteracts the closing action of the regulating control valve B and, in the small-admission position, balances the forces acting on opposite sides of the diaphragm 13, which is thereby retained in its adjusted position and does not further close the main valve A. If the pilot flame 40 goes out, the safety control valve 38, 39 is again fully closed and as before the diaphragm 13 is actuated to close the main valve A completely.

Figs. 3a, b and c, show a main gas valve A, the head 12 of which is moved into open position by an increase of pressure in the control chamber 15. In this instance, the diaphragm 13 is shut off, in a gas-tight manner from the high-pressure side 57 of the main-valve casing, by a partition 56, and the breather space 58 between it and the partition 56 communicates with the outer air through a vent pipe 59. A spring 100 tends to keep the head 12 of the main valve in closed position. The gas is drawn from the main supply pipe 10 through a control-gas pipe 60, the outlet 39 of which opens into the casing 35 of the safety burner D and is controlled by the safety control valve 38 of the latter. From the casing 35 of the safety burner D, a control-gas pipe 61 leads to a casing 62, the one outlet 22 of which is controlled by the regulating control valve 21 of the thermo-regulator B, while the other outlet 29 is controlled by the ball 28 of a small-admission control valve C (already described with reference to Figs. 1a, b and c). The outlet 22 communicates with the control chamber 15 of the main valve A by way of a pipe 63, and the outlet 29 also communicates with the same chamber by way of the opening 32. With this arrangement the control chamber 15 must be in permanent communication with the atmosphere. This can be effected by connecting the chamber 15 with a vent pipe 65, by way of a throttle 64 (see chain-dotted lines in Figs. 3b and 3c). The vent pipe 59 of the breather space 58 is connected with the vent pipe 65. In order to save a separate vent pipe 65, however, the choke 64 is preferably arranged in the diaphragm 13 or the diaphragm plate (as shown in Fig. 3a), the control chamber 15 being vented by way of the breather space 58. The control gas flowing off from the control chamber through the vent pipes 59 or 65 is preferably led into the vicinity of the ignition burner, or main burner, so that it can be rendered harmless by combustion.

The main gas valve represented in Figs. 3a, b and c, functions in the following manner:

In Fig. 3a, the pilot flame 40 is alight, and therefore the safety control valve 38, 39 of the safety burner D is open. The heat sensitive member 19 of the thermo-regulator B is still cold, so that the regulating control valve 21, 22 of the regulator B is also open. In consequence, the control gas flows through the pipes 60, 61, 63 into the control chamber 15 of the main valve A, and accumulates there by reason of the choke 64. The gas therefore depresses the diaphragm 13 against the action of the spring 100 and moves the head 12 of the main valve into the fully-open position. If the member 19 now becomes warm, it gradually closes the regulating control valve 21, 22. The control gas flowing to the control chamber 15 is therefore throttled down, so that its pressure on the diaphragm 13 diminishes. Consequently, the spring 100 lifts the diaphragm 13 until the valve spindle 13 lifts the ball 28 of the small-admission control valve C from its seating 29 and opens a wider passage for the control gas to the control chamber 15, the valve C thus again acts in opposition to the regulating control valve B with the result that, in a predetermined position of the diaphragm, equilibrium is established between the forces acting on the diaphragm, so that the latter—and with it the head 12 of the main valve—remain in the minimum open position in which the main burner can continue to burn with a small gas supply (Fig. 3b). If, however, the pilot flame 40 is extinguished, the safety control valve 38, 39 of the safety burner D closes, so that no gas can continue to reach the control chamber 15. The pressure in this chamber therefore ceases as it is in communication with the outer air by way of the throttle 64 and also through the pipe 63 and the burner orifice 37 of the safety burner D. (Fig. 3c.)

The main gas valve shown in Figs. 4, a, b and c,—like that shown in Figs. 3, a, b and c—is opened by increased pressure in the control chamber 15, and differs only in that the safety control valve 38, 39 of the safety burner D is arranged in the vent pipe 59 of the breather space 58, instead of in the control-gas pipe 60 leading to the control chamber 15.

This arrangement functions in the following manner:

The control gas from the main supply pipe 10 flows (in Fig. 4a) through the pipe 60, control-gas casing 62 and the regulating control valve 21, 22 (closed when the sensitive member 19 is cold) of the thermo-regulator B, and the pipe 63, into the control chamber 15 of the main gas valve A. In this chamber it accumulates since it is only through the choke 64 that it can escape into the breather space 58 below the diaphragm 13, to issue through the vent pipe 59 and flow, by way of the safety control valve 38, 39 of the safety burner D, to burn off in the pilot flame 40 at the orifice 37 of the said burner. A slight leakage of gas takes place through the aperture 66 in the member 67 guiding the main-valve spindle through the partition 56 and enables a small amount of gas to pass continuously through the pipe 59 to the pilot burner, for the purpose of permanently maintaining the pilot flame 40 alight. When the heat sensitive member 19 of the thermo-regulator B becomes warm, it gradually closes the regulating control valve 21, 22 so that, as the result of the decreasing pressure of control gas, the diaphragm 13 is lifted by the spring 100, and the head 12 of the main valve moves in the closing direction until the valve spindle 33 again opens the small-admission control valve 28, 29 and thus arrests the further closing action of the thermo-regulator B (Fig. 4b). If, however, the pilot flame 40 be extinguished (Fig. 4c), the safety control valve 38, 39 closes the outlet of the vent pipe 59. Consequently, the control gas entering through the choke 64, accumulates in the breather space 58—as does also that entering through the aperture 66—so that pressure on both sides of the diaphragm 13 is balanced, and the spring 100 closes the main valve A.

Finally, Figs. 5a, b and c, represent another type of a main gas valve according to the invention which is influenced by a small-admission control valve. The main supply pipe 10 again opens into the high pressure chamber 57 of the main valve A, the valve orifice 67 of which, leading to the main-gas outlet, is controlled by the valve 12.

The control chamber 15 is located below the diaphragm 13 and is shut off from the high-pressure chamber 57 by a smaller diaphragm 68. The control gas is again drawn from the main pipe 10 through a pipe 60, and passes through the safety control valve 38, 39 of the safety burner D, into the casing 35 of the latter, from whence it passes, through a choke 69 and pipe 70, into the control chamber 15. Said pipe 70 also serves at a vent pipe for the control chamber 15, which is always open to the outer air by way of the orifice 37 of the safety ignition burner D. From the pipe 70, a further vent pipe 71 leads to the breather space 72 and thence into the open by way of a vent pipe 73. The connecting pipe 71 is controlled by the regulating control valve 21, 22 and by the counteracting small-admission control valve 28, 29. A spring 74 in the breather space 72 tends to close the main valve A.

The arrangement shown in Figs. 5, a, b and c, functions in the following manner:

In Fig. 5a, the pilot flame 40 is alight and keeps the safety control valve 38, 39 open. The heat sensitive member 19 of the thermo-regulator B is still cold and holds the regulating control valve 21, 22 closed. Consequently, the control gas flows from the pipe 60 into the casing 35 of the pilot burner, and through the choke 69 and the pipe 70 into the control chamber 15 of the main valve, where it accumulates under the throttling effect of the orifice 37 of the pilot burner. The pressure of the accumulated gas forces the diaphragm upwards to open the main gas valve 12 fully. If now the heat sensitive member 19 becomes warm, it opens the regulating control valve 21, 22 and allows a portion of the control gas to escape into the open by way of the pipe 71, breather space 72 and vent pipe 73. Consequently, the control-gas pressure in the control chamber 15 falls and the diaphragm 13 is moved, by the spring 74, in the closing direction, until the valve spindle 33 again allows the ball 28 to sink on to the seating 29 of the small-admission control valve C, so as to close or throttle the end of the pipe 71, (Fig. 5b). The forces acting on opposite sides of the diaphragm 13 therefore become balanced, so that the diaphragm 13 remains in the small-admission position and the main valve A (12, 67) does not close any further. Directly, however, the pilot flame 40 is extinguished (Fig. 5c), the safety control valve 38, 39 closes, and no control gas can continue to reach the control chamber 15. Said chamber is completely vented by way of the burner orifice 37, thus enabling the spring 74 to close the main valve 12, 67 completely. Of course, it is not essential that the pipe 71 should communicate with the vent pipe 73 through the breather space 72 of the main gas valve. The casing 27 of the small-admission control valve C may also be separate from the main-valve casing, and its orifice 29 could open directly into the open air. The arrangement shown is, however, preferable because it enables a compact structural combination to be attained between the diaphragm casing and the small-admission control valve C functioning in subordination to the setting of the diaphragm.

Fig. 6 represents a specially advantageous combination of an adjustable thermo-regulator B with an adjustable small-admission control valve C. The gas enters through the main supply pipe 10 into the high-pressure chamber 57 of the main valve A. The gas flows, through a passage 76 in the cover 75 of the main-valve casing, into the annular space 77 of a control-valve casing 78, which can be adjusted by screwing it in the guide 79. The member 19 is firmly secured to the control-valve casing 78, so that, by turning the manipulating cap 83 being firmly fixed to the member 19, the control-valve casing 78 can be raised or lowered for the purpose of adjusting the operative position of the small-admission control valve C. A pointer 80 mounted adjacent a scale provided on the casing 78, indicates the setting of said casing. The control gas passes, through bores 81, into the chamber 82 above the control-valve casing 78. This casing 78 contains the valve seating 22 for the regulating control valve 21 which is connected, by the rod 20, with the heat-sensitive tube 19 of the thermo-regulator B. The ball 28 of the valve C is located in a central passage 84 in the valve casing 78, at the lower end of which is situated the seating 29 of the valve C. The thermo-regulator B is adjusted by means of the head 85 of a screw 86, which is guided in the cap of the heat sensitive tube 19 and is secured to the rod 20 of the thermo-regulator B. As in the case of Figs. 1a, b and c, the control gas flows from the control chamber 15, through a choke 44, into a control-gas outlet pipe 34 controlled by the safety control valve 38, 39 of the safety ignition burner D. If the control gas were led as in the case of Figs. 5a, b and c, the bores 81 would, of course, not lead into the chamber 82 above the control-valve casing 78, but would be allowed to open into the central bore 84. The essential point is that the two seatings, 22 of the regulating control valve B, and 29 of the small-admission control valve C, should be located in a common control-valve casing 78, which carries the device for adjusting the regulating control valve B and is adjustable, in common therewith, in relation to the actuating member (valve spindle 33) for the small-admission control valve C.

Whereas Figs. 1-6 represent main gas valves in which the small-admission control valve is subordinated to the setting of the main gas valve, or its adjusting member (diaphragm 13), Figs. 7a, b and c, and 8a, b and c, illustrate main gas valves in which the small-admission control valve is subordinated to the gas pressure in the pipe leading from the main valve to the main burners.

In Figs. 7a–c, 110 is the main supply pipe, which opens into the high-pressure chamber 157 of the main gas valve A. The diaphragm 113 again carries the head 112 of the main valve, which controls and regulates the passage of gas to the main-gas pipe 111. The control gas is lead, through a pipe 116 branching from the main pipe 110, to the control-valve casing 118 of a thermo-regulator B, composed of the heat sensitive tube 119, rod 120, head 121 and seating 122. Said seating forms the inlet to a control-gas chamber 126, the outlet of which is formed by the seating 129 of the small-admission control valve C, and is controlled by the member 128 of said valve. The outlet 129 of the chamber 126 opens into a pipe 132 leading to the control chamber 115 of the main valve A. From the control chamber 115, the control gas can flow, through a choke 141 and delivery pipe 134, to the safety burner D, which comprises a burner casing 135, thermostat plate 136 (with burner orifice 137) and control-valve member 138 which controls the seating 139 serving as outlet to the pipe 134. From the valve casing 118 of the thermo-regulator B, a pipe 142 serving for the constant supply of gas to the pilot flame 140, leads to the outlet pipe 134 into which it opens through a choke 144. The control gas is led in substantially the same manner as that shown in Figs. 1a, b and c. In the present instance, however, the small-admission control valve 128 is actuated by an adjusting member, such as a diaphragm 200 arranged in a casing 201 so as to form two separate chambers 202 and 203. The chamber 202 contains a loading spring 204 and is connected with the open air by way of an opening 205, so that it serves as a breather space. The other chamber 203 serves as a control chamber and communicates, by way of a pressure-transmission pipe 206, with the main-gas delivery pipe 111.

The arrangement shown in Figs. 7a, b and c functions in the following manner:

In Fig. 7a, the pilot flame 140 is alight, so that the safety control valve 138, 139 of the safety ignition burner D is opened. The heat-sensitive tube 119 of the thermo-regulator B is still cold, and therefore holds the regulating control valve 121, 122 in the closed position. Consequently, the control gas from the pipe 116 flows only through the pipe 142 and choke 144 into the delivery pipe 134, and issues through the orifice 137 of the safety burner D without setting up any pressure in the control chamber 115. In consequence, the diaphragm 113 of the main gas valve A is raised by the pressure of the main gas and lifts the head 112 of the said valve into the open position. When the heat sensitive member 119 of the thermo-regulator B becomes warm, it opens the regulating control valve 121, 122 and allows the control gas to enter the chamber 126, from which it can pass, through the pipe 132, into the control chamber 115 of the main valve A, as long as the pressure of the main gas, acting on the diaphragm 200 in the control chamber 203 of the small-admission control valve C is sufficient to keep the valve 128, 129 open. Under the influence of the choke 141, the control gas entering the control chamber 115 accumulates therein and generates a pressure which depresses the diaphragm 113, so that the head 112 of the main valve also moves toward its closing position and throttles the flow of the main gas (Fig. 7b). The pressure of the gas (on the way to consumption) in the pipe 111 therefore decreases and this reduction in pressure is also transmitted to the control chamber 203 of the small-admission control valve C. As a result, the loading spring 204 will close the valve 128, 129 as soon as the pressure in the pipe 111 has reached a predetermined low limit (Fig. 7b) so that the flow of control gas to the control chamber 115 of the main valve A is interrupted, or is throttled to such an extent that equilibrium is established between the forces acting on opposite sides of the diaphragm 113, the effect being to retain said diaphragm in the adjusted small-admission position, and to prevent the main valve A from being closed completely. However, directly the pilot flame 140 is extinguished, the safety control valve 138, 139 of the safety burner D closes the control-gas outlet of the pipe 134, so that the pilot-flame gas and the control gas accumulate in the control chamber 115 of the main valve A and close said valve completely.

Whereas, in the case of the main valve shown in Figs. 7, b and c, an increase of pressure in the control chamber 115 causes the main valve to close, the example represented in Figs. 8a, b and c, is so arranged that increased pressure in the chamber 115 effects the opening of the main valve. The design of said valve and the method of leading the control gas correspond substantially to those shown in Figs. 5a, b and c, with the sole exception that—as in Figs. 7a, b and c—the small-admission control valve C is actuated by the pressure of the gas passing in the delivery pipe to the main burner.

The arrangement shown in Figs. 8a, b and c, functions in the following manner:

In Fig. 8a, the pilot flame 140 is alight, so that the safety control valve 138, 139 of the safety burner D is open. The heat sensitive member 119 of the thermo-regulator D is still cold and holds the regulating control valve 121, 122 in the closed position. The control gas drawn off, through the pipe 160, from the main supply pipe, then flows through the pipe 170 into the control chamber 115 of the main valve A, where its pressure lifts the large diaphragm 113 and thus fully opens the valve A (112, 167). Directly the heat sensitive member 119 becomes warm, it opens the regulating control valve 121, 122, and allows a portion of the control gas to pass away through vent pipes 171, 173, controlled by the valve C. The pressure in the control chamber 115 therefore sinks and the diaphragm 113, together with the valve member 112, moves in the direction of closing. The resulting reduction of pressure in the gas delivery pipe 111 is now transmitted, through the pipe 206, to the control chamber 203 of the small-admission control valve C and effects the closing of the valve 128, 129 (Fig. 8b). The result of this is that the pressure in the control chamber 115 again rises, and, through the action of the valve C, a state of equilibrium is established between the forces acting on opposite sides of the diphragm 113 of the main valve, so that said diaphragm is retained in the desired small-admission position, and a sufficient amount of gas to keep the main burner alight, in the turned-down condition, can pass through the main valve A. Directly, however, the pilot flame 140 is extinguished, the safety control valve 138, 139 of the burner D, shuts off the supply of control gas, so that the control chamber 115 of the main valve vents through the burner orifice 137, and the descending diaphragm 113 closes the main gas valve A completely. A predetermined small-admission setting can be fixed, when the corresponding control valve is actuated by the gas passing, for combustion, to the main burner (for example) by modifying the loading of the diaphragm 200, or by varying the spacing between the valve member 128 and the seating 129.

It should again be emphasized that the safety ignition burner D is to be considered solely as an example, and that it may be replaced, or supplemented, by any other safety control valves which act so as completely to close the main gas valve. Similarly, the heat-sensitive member B is intended solely as an example of a regulating control valve, and may also be replaced, or supplemented, by other regulating control valves.

Having now particularly described and ascertained the nature of our said invention, and in what manner the same is to be performed, we declare that what we claim is:

1. A control valve apparatus for gas-burners and the like, comprising a main gas conduit, a main gas valve arranged to control the flow of gas through said conduit, a pressure-actuated movable member connected to and arranged to adjust said main gas valve, a safety control valve and connections therefore arranged to cause a fluid pressure on that side of said movable member which will actuate it to close the main valve upon closing of said safety control valve, a regulator valve and connections therefor arranged to vary the pressure on one side of said movable member to adjust the position of the main gas valve, and an auxiliary control valve and connections therefore arranged to move responsive to variations in position of said movable member, to bring said movable member to a position of equilibrium with the gas valve still open, and thereby to prevent the regulating valve alone from completely closing the main gas valve.

2. A control valve apparatus according to claim 1, in which the auxiliary control valve is actuated directly by mechanical means connected to said movable member.

3. A control valve apparatus according to claim 1, in which the auxiliary control valve is actuated by a movable member subjected to the gas pressure in that part of the main conduit beyond the main gas valve.

4. A control valve apparatus according to claim 1, having the seat for the regulating valve and the seat for the auxiliary control valve in a common casing having passages for the control gas, and provided with a device for adjusting the regulating valve, said casing being adjustable relatively to the member which actuates the auxiliary control valve.

5. A control valve for gas-burners and the like, comprising a main gas conduit, a main gas valve arranged to control the flow of gas through said conduit, a pressure-actuated movable member arranged to operate said main gas valve, casing means enclosing said movable member and exposing one side thereof to the gas pressure in said main gas conduit on the high pressure side of said main gas valve, said casing means being arranged to provide a control chamber on the side of said movable member opposite its first mentioned side with said movable member forming a movable wall of said control chamber, conducting means for conducting gas from the high pressure side of the main conduit to the said control chamber, a regulating valve arranged to control the flow of gas through said conducting means, an auxiliary control valve also arranged to control the flow of gas through said conducting means after it has passed the regulating valve, means actuated by the movable member for determining the movement of the auxiliary valve, and a throttled conduit arranged to connect the said control chamber with the main gas conduit.

WERNER LORENZ.
CURT STEINHARDT.